3,463,786
METHOD OF RESOLVING dl 6 - PHENYL - 2,3,5,6-TETRAHYDROIMIDAZO[2,1-b] - THIAZOLE AND NOVEL COMPOUNDS RESULTING THEREFROM
Milon Walker Bullock, Hopewell, N.J., assignor to American Cyanamid Company, Stamford, Conn., a corporation of Maine
No Drawing. Continuation-in-part of application Ser. No. 554,307, June 1, 1966. This application Dec. 19, 1967, Ser. No. 691,710
Int. Cl. C07d 91/32; A61k 27/00
U.S. Cl. 260—306.7          11 Claims

ABSTRACT OF THE DISCLOSURE

The preparation and isolation of the optically active chemical compounds 1(—)6 - phenyl-2,3,5,6-tetrahydroimidazo[2,1-b]thiazole free or substantially free of contaminating dextro-isomer, and d(+)6-phenyl-2,3,5,6-tetrahydroimidazo-[2,1-b]thiazole free or substantially free of 1-isomer is described. The 1-isomer is superior as an anthelmintic.

CROSS-REFERENCE TO A RELATED APPLICATION

This is a continuation-in-part of application Ser. No. 554,307, filed on June 1, 1966, and now abandoned.

BACKGROUND OF THE INVENTION

The optically inactive dl 6-phenyl-2,3,5,6-tetrahydroimidazo[2,1-b]thiazole has been found to be a broad spectrum anthelmintic compound extremely effective for the treatment of helmenthiasis in domestic animals. A method for the preparation of this dl-compound and reports of useful biological activity have been published in the Netherlands, Patent No. 6,505,806, issued Dec. 12, 1965. This dl-compound has a good margin of safety for many host species but greater margins of safety are needed for some species. In attempts to further develop the usefulness of this compound and improve its margin of safety, considerable effort was expended to resolve said compound. I have now found a process for resolving said compound into purified compositions of either the dextro compound or levo compund each free of contamination by the other. Heretofore, all attempts to achieve resolution have ended in failure, and previously, there has been no means available for obtaining the optically active 1(—)6 - phenyl - 2,3,5,6-tetrahydroimidazo[2,1-b]thiazole as a pure chemical compound free of the d-isomer, nor has there been means available for isolating the optically active d(+)6-phenyl-2,3,5,6-tetrahydroimidazo[2,1-b]thiazole in a purified form free or substantially free of the contaminating l-isomer.

SUMMARY OF THE INVENTION

It is therefore surprising to discover that the dextro and levo antipodes of this compound can be produced in substantially pure forms essentially free of the other isomer. It is also surprising to discover that the desired anthelmintic activitiy is associated only with the levo form and that the 1(—)6-phenyl-2,3,5,6-tetrahydroimidazo[2,1-b]thiazole has a much greater margin of safety in animals than does the known racemic dl-compound. With the discovery of the increased margin of safety of the l-compound, it is contemplated that said l-compound and the hydrogen halide salt thereof will be useful in warm-blooded animals such as specifically exemplified hereinafter. Although the dextro form had no anthelmintic activity, it was found to be toxic. In comparing the dl-compound with the l-compound, we find that the dl-compound has a melting point of 90° C. while the 1 or d-compounds have a melting point of 60°–61.5° C. and treatments using the levo form have twice the margin of safety of treatments prepared from the racemic dl-compound.

Furthermore, it was found that although the dextro form is ineffective anthelmintically, it has its own utility as an intermediate in a new process for the preparation of the racemic dl-compound and subsequently, the optically active anthelmintically effective l-antipode.

In accordance with the present invention, the levo compound may be prepared as a crystalline compound or solution free of the dextro compound. Similarly, the dextro compound may be prepared in crystalline form or as a solution free of the levo antipode.

The process which we have discovered for the resolution of dl 6-phenyl-2,3,5,6-tetrahydroimidazo[2,1-b]thiazole into its dextro and levo forms takes advantage of an unexpected and unpredictable property of the camphor-10-sulfonic acid salt. At temperatures above about 45° C. both the dextro and levo 6-phenyl-2,3,5,6-tetrahydroimidazo[1,2-b]thiazoles form salts with d-10-camphorsulfonic acid which are extremely soluble in chloroform. As the temperature of the solution is lowered below approximately 35° C. the dextro 6-phenyl-2,3,5,6-tetrahydroimidazo[2,1-d]thiazole d-10-camphorsulfonate salt undergoes a transition to a solvate containing apparently three molecules of chloroform. This solvate is very insoluble in chloroform and crystallizes out as a nicely crystalline compound while the levo-isomer does not crystallize from chloroform. The recovery of the d-acid d-base salt amounts to approximately 90% of the theoretical amount and it is essentially optically pure. It can be recrystallized from chloroform with recoveries of about 95%. The levo 6-phenyl-2,3,5,6-tetrahydroimidazo-[2,1-b]thiazole d-10-camphorsulfonate salt can be recovered from the mother liquor from which its diasterioisomer has crystallized by evaporation of most of the chloroform and adding hot acetone to the syrupy residue. A complex salt separates from the hot solution which is composed of approximately two molecules of the acid and one molecule of d-base and one of l-base. Filtration of the hot solution removes this salt which contains the balance of the l-amine along with some of the d-amine. This racemic salt can be separated into its diasterio-isomers by repeating the recrystallization from chloroform.

When the acetone filtrate from which the insoluble salt was recovered is allowed to cool, crystals of the levo 6 - phenyl-2,3,5,6-tetrahydroimidazo[2,1-b]thiazole d-10-camphorsulfonate separate. The yield of this salt is about 70% of the theoretical amount. It is obtained in a high state of optical purity but can be recrystallized from acetone if desired.

The diasterio-isomer salts, d(+)6-phenyl-2,3,5,6-tetrahydroimidazo[2,1-b]thiazole d-10-camphorsulfonate and 1(—)6 - phenyl - 2,3,5,6-tetrahydroimidazo[2,1-b]thiazole d-10-camphorsulfonate, can be converted to their free bases by treatment of the salts or preferably solutions of the salts with an amine such as ammonia or an alkali metal hydroxide or carbonate. The liberated dextro or levo 6 - phenyl-2,3,5,6-tetrahydroimidazo[2,1-b]thiazole bases can be converted to pharmaceutically acceptable salts by methods familiar to those skilled in the art. The camphorsulfonic acid can also be recovered by procedures familiar to those skilled in the art and used in subsequent resolutions.

For simplicity the process has been described for the use of d-10-camphorsulfonic acid. The process can be operated in exactly the same way with 1-10-camphorsulfonic acid. The compounds obtained with this isomer will be identical in all physical chemical properties to those obtained with the d-isomer except that they will rotate the plane of polarized light in the opposite direction.

Although both optically active forms of the amine can be obtained readily from either d- or l-10 camphorsulfonic acid, the d-acid gives the best yield of the d-amine and the l-acid gives the best yield of the desired l-amine. We have found that our process can be operated to resolve dl-10-camphorsulfonic acid into its d and l forms. The l-10-camphorsulfonic acid is the preferred form for preparing l(−)6-phenyl-2,3,5,6 - tetrahydroimidazo[2,1-b]thiazole. The resolution of dl-amine with an optically active 10-camphorsulfonic acid can be carried out as described above and the optically active amines obtained can in turn be used to resolve dl-10-camphorsulfonic acid. The resolution of the dl-amine and the dl-10-camphorsulfonic acid can be carried out in the same operation by the following precedure. The dl-amine is treated with at least enough d-10-camphorsulfonic acid in chloroform to cause most of the d-amine to be crystallized out as the d(+)6-phenyl - 2,3,5,6-tetrahydroimidazo[2,1-b]thiazole d-10-camphorsulfonate salt. After the crystals have been collected, the mother liquor is concentrated to a syrup and acetone is added which causes the separation of an insoluble racemic salt leaving substantially pure l(−)amine and its d-10-camphorsulfonate in solution. The amine is recovered as the free base and combined with dl-10-camphorsulfonic acid in hot chloroform. The product that crystallizes on cooling is l(−)6 - phenyl-2,3,5,6-tetrahydroimidazo[2,1 - b]thiazole l-10-camphorsulfonate salt which separates as the highly insoluble chloroform solvate. After the crystals are collected, the chloroform is evaporated and replaced by hot acetone. Now the l(−)6-phenyl-2,3,5,6-tetrahydroimidazo[2,1-b]thiazole d-10-camphorsulfonate crystallizes from the solution on cooling. The chemical and physical properties of the salts obtained in resolving dl-10-camphorsulfonic acid are identical to those obtained in resolving the dl-amine with the d-acid except that l-amine l-acid salt will rotate the plane of polarized light in the opposite direction from the d-amine d-acid salt. There is no racemic double salt formed in the resolution of the racemic acid with optically active amine.

When the various 10-camphorsulfonate salts are decomposed, we get both the d and the l-amine and the d and the l-camphorsulfonic acids. Some modifications, such as a shift in the acid-amine ratio or the use of mixtures of water and chloroform or carbon tetrachloride and chloroform for the resolution are permissible. When chloroform and water mixtures are used, the quantity of chloroform should be not less than 3 moles of chloroform for each mole of camphor-sulfnic acid acid present.

DETAILED DESCRIPTION

The following examples illustrate the process of the present invention and novel products produced thereby.

Example 1 dl 6-phenyl - 2,3,5,6 - tetrahydroimidazo[2,1-b]thiazole hydrochloride, 188 grams (0.785 mole), is suspended in a mixture of 500 milliliters of water and 500 milliliters of methylene chloride. The suspension is stirred mechanically while 20% sodium hydroxide solution is added until the solution is basic. Ice is added from time to time to keep the temperature below the boiling point of the methylene chloride. The methylene chloride layer is separated, washed with water, dried over potassium carbonate and evaporated. The oily residue crystallizes with the evolution of the heat when poured into a beaker containing 100 milliliters of ether. The free base is washed with ether. The yield of dl 6-phenyl-2,3,5,6-tetrahydroimidazo[2,1-b]thiazole is 151.4 grams (0.746 mole), 94%. The product has a melting point of 90° C.

Example 2

A mixture of 2.04 grams (10 m. mole) of dl 6-phenyl-2,3,5,6-tetrahydroimidazo[2,1-b]thiazole and 2.32 grams (10 ml. mole) of d-10-camphorsulfonic acid is dissolved in 10 milliliters of 95% ethanol. On standing large crystals separate which are removed by filtration and washed with ethanol. This salt has a melting point of 195°–196° C. and a rotation of +14.1° (C.=16, H$_2$O). It is dl 6-phenyl - 2,3,5,6 - tetrahydroimidazo[2,1-b]thiazole d-10-camphorsulfonate. This salt recrystallized unchanged from acetonenitrile, nitromethone, ethylene chloride and several other solvents. It is very insoluble in methyl isobutyl ketone and acetone. It is a true racemic compound and when the amine is recovered from this salt, it is found to be totally unresolved. It is resolved upon recrystallization from chloroform.

Example 3

A solution of 204.3 grams (1 mole) of dl 6-phenyl-2,3,5,6-tetrahydroimidazo[2,1-b]thiazole and 232.3 grams (1 mole) of d-10-camphorsulfonic acid in 1750 milliliters of chloroform is allowed to crystallize overnight at −28° C. The solvate is recovered by filtration and washed with ice cold chloroform (400 milliliters). The solvate is dried (decomposed) under nitrogen seven hours and then in air overnight. The yield of d(+)6-phenyl-2,3,5,6-tetrahydroimidazo[2,1-b]thiazole d-10 - camphorsulfonate is 202.5 grams (0.464 mole) 92.8%, melting point 139°–140°, $\alpha_D^{25}$+82.6 (C.=16, H$_2$O).

The trisolvate separates only below its transition temperature which is about 35°. Cooling to 0° is about as good as −28°. It separates as fine needles which are very easy to filter and wash. The solubility in chloroform is only 0.34 gram per 100 milliliters at 0°. The solvate becomes sticky in air on humid days but can be dried in a stream of air on dry days. It dries to the non-solvated apparently anhydrous salt. The solvate melts about 35° and is souble in methylene chloride and in acetone. It can be recrystallized from 2 milliliters or less per gram of chloroform with a recovery of 95%. Recrystallized material melts at 140°–141° and has $\alpha_D^{25}$+83 (C.=15, H$_2$O).

Following the procedure above and substituting l-10-camphorsulfonic acid for d-10-camphorsulfonic acid yields the l(−)6-phenyl-2,3,5,6-tetrahydroimidazo[2,1-b]thiazole l-10-camphorsulfonate.

Example 4.—Preparation of l(−)6-phenyl-2,3,5,6-tetrahydroimidazo - [2,1-b]thiazole d - 10 - camphorsulfonate The mother liquor from which the salt is prepared in Example 3 is taken and is evaporated to a syrup. The syrup which is approximately one-half chloroform by weight is treated with 1500 milliliters of hot acetone. The resulting solution is kept near the boiling point for ten minutes during which time the solid crystallizes out. The crystals are collected by filtering the hot solution. The material on the filter is washed with 200 milliliters of hot acetone and dried. This salt weighs 24.2 grams (0.055 mole) and melts at 186°–192° $\alpha_D^{25}$−14.7 (C.=16, H$_2$O). It is not an optically pure salt and can be resolved by recrystallization from chloroform. The mother liquor (acetone filtrate) is stored at −15° overnight. The crystalline product is recovered by filtration and washed with 150 milliliters of cold acetone. The yield of this l(−)6-phenyl - 2,3,5,6 - tetrahydroimidazo[2,1-b]thiazole d-10-camphorsulfonate is 168.1 grams (0.385 mole), 77% melting point 130°–132° $\alpha_D^{25}$−54.7 (C.=16, H$_2$O).

The mother liquor is evaporated leaving 22.8 grams of syrup. The hot syrup is dissolved in 100 milliliters of hot methyl isobutyl ketone. The product crystallizes within a few minutes. The mixture is cooled to room temperature and the product recovered by filtration and washed with methyl isobutyl ketone. This fraction weighs 16.74 grams (0.038 mole), 7.7% and has a melting point of 128°–130° (cloudy) $\alpha_D^{25}$−57.1° (C.=16, H$_2$O).

The first crop of crystals, 168 grams, is recrystallized from 5 milliliters per gram of acetone (cooled to −15°).

The recovery is 158 grams, 94%, melting point 130°–131° $\alpha_D^{25}$—56.3 (C.=15, $H_2O$).

Where the mother liquor from the process of Example 3 is obtained from the process employing the l-camphorsulfonic acid and said mother liquor is treated in the manner above, d(+)6-phenyl-2,3,5,6-tetrahydroimidazo[2,1-b] thiazole l-10-camphorsulfonate is obtained.

Example 5.—Preparation of d(+)6-phenyl-2,3,5,6-tetrahydroimidazo[2,1-b]-thiazole A solution of 150 grams (0.344 mole) of d(+)6-phenyl - 2,3,5,6-tetrahydroimidazo[2,1-b]thiazole. d-10-camphorsulfonate in water is treated with 15.5 grams (0.378 mole) of 98% sodium hydroxide and the liberated base extracted with choloroform. The chloroform solution is washed with water followed by sodium chloride solution and dried over magnesium sulfate. Evaporation of the solvent left 72.1 grams of residue which crystallized shortly. The free base hereby obtained has a melting point of 60°–61.5° C. and an optical rotation $\alpha_D^{25}$+85.1 (C.=10, $CHCl_3$).

Example 6.—Preparation of d(+)6-phenyl-2,3,5,6-tetrahydroimidazo[2,1-b]-thiazole hydrochloride The free base d(+)6 - phenyl - 2,3,5,6 - tetrahydroimidazo[2,1-b]thiazole is dissolved in 112 milliliters of acetone and 178 milliliters of isopropanolic hydrogen chloride is added all at once. The hydrochloride crystallizes at once. After cooling to below 0°, the salt is recovered by filtration and washed with acetone. The product weighs 75.2 grams (0.312 mole), 91%, from the camphorsulfonate, melting point 227°–227.5°$\alpha_D^{25}$+123.1° (C.=15, $H_2O$).

Example 7.—Preparation of 1(—)6-phenyl-2,3,5,6-tetrahydroimidazo[2,1-b]thiazole A solution is made by dissolving 158.1 grams (0.36 mole) of 1(—)6 - phenyl - 2,3,5,6 - tetrahydroimidazo[2,1-b]thiazole d-10-camphorsulfonate in 400 milliliters of water. The solution is clarified by treating with a little "Darco G–60" charcoal and filtering. The salt is decomposed by adding a solution of 16.3 grams (0.4 mole) of 98% sodium hydroxide in 100 milliliters of water. The free base is recovered by three extractions with chloroform. The chloroform extracts are combined, washed with water and with saturated sodium chloride, and dried over magnesium sulfate. Evaporation of the solvent left 75 grams of the free base having a melting point 60°–61.5° C. and an optical rotation $\alpha_D^{25}$—85.1° (C.=10, $CHCl_3$).

Example 8.—Preparation of 1(—)6-phenyl-2,3,5,6-tetrahydroimidazo[2,1-b]thiazole hydrochloride The free base 1(—)6-phenyl-2,3,5,6-tetrahydroimidazo-[2,1-b]thiazole is dissolved in 125 milliliters of acetone. The turbidity is removed by mixing in a little activated charcoal and filtering. The acetone solution is treated all at once with 110 milliliters of 3.82 N isopropanolic hydrogen chloride. The hydrochloride crystallizes rapidly. After cooling, it is recovered by filtration and washed with acetone. The yield is 84.0 grams (0.349 mole), 96.9%, based on the d-10-camphorsulfonate. The product has a melting point of 227°–229° and has $\alpha_D^{25}$—122.9° (C.=15, $H_2O$).

Example 9.—Resolution of dl-10-camphorsulfonic acid

A warm solution prepared by dissolving 8.5 grams (0.0416 mole) of 1(—)6-phenyl-2,3,5,6-tetrahydroimidazo[2,1-b]thiazole and 9.67 grams (0.416 mole) of dl-10-camphorsulfonic acid in 83 milliliters of chloroform is allowed to crystallize below 0° overnight. The chloroform soluate is recovered by filtration and washed with cold chloroform and decomposed by drying in a nitrogen atmsphere. The yield is 8.66 grams (0.0198 mole), 95%, of the theoretical amount of 1(—)6-phenyl-2,3,5,6-tetrahydroimidazo[2,1 - b]thiazole 1 - 10 - camphorsulfonate. The product has a melting point of 135°–138° and has $\alpha_D^{25}$—72.7 (C.=15, $H_2O$) and it is obtained from the solution. The product is the mirror image of d(+)6-phenyl-2,3,5,6 - tetrahydroimidazo[2,1 - b]thiazole d-10-camphorsulfonate and will have a melting point of 141° and $\alpha_D^{25}$—84° after purification.

The mother liquor from which the soluate is filtered is evaporated to a syrup and 63 milliliters of hot acetone is added. The solution is filtered to remove a trace of insoluble material and allowed to cool to —5°. The crystals which separate are collected by filtration and washed with cold acetone. The yield is 6.0 grams (0.137 mole), 63%, melting point 131.5°–132.5° (cloudy), $\alpha_D^{25}$+50.0 (C.=15, $H_2O$). The salt is 1(—)6-phenyl-2,3,5,6-tetrahydroimidazo[2,1 - b]thiazole d - 10 - camphorsulfonate. This is the same product as prepared in Example 4.

Example 10

A two phase mixture of 8.72 g. (20 millimoles) dl 6-phenyl-2,3,5,6-tetrahydroimidazo[2,1 - b]thiazole d - 10-camphorsulfonate, 4.80 g. (20 millimoles) of dl 6-phenyl-2,3,5,6-tetrahydroimidazo[2,1-b]thiazole hydrochloride, 25 ml. water, and 7.16 g. (60 millimoles) of chloroform is cooled to 0° and seeded. After standing over the weekend at 0° the d(+)6-phenyl-2,3,5,6-tetrahydroimidazo[2,1-b]thiazole d - 10 - camphorsulfonate chloroform solvate is recovered by filtration and washed three times with 10 ml. portions of ice cold water which has been saturated with chloroform. The solvate is dissolved in water, ammonium hydroxide is added and the amine recovered by extraction with ether. Evaporation of the aqueous layer left 3.4 g. (13.6 millimoles), 68.5% of ammonium d-10-camphorsulfonate.

The ether extract is dried (sodium sulfate) and the solvent evaporated. The residue is dissolved in acetone and the solution acidified with 4 N isopropanolic hydrogen chloride to precipitate the amine hydrochloride. The yield of d(+)6-phenyl-2,3,5,6-tetrahydroimidazo[2,1-b] thiazole hydrochloride is 3.10 g. (12.9 millimoles) 64.5% of theory, melting point 226°–230° C. The specific rotation $\alpha_D^{25}$ is +108° (C.=10, $H_2O$) (93.5% optically pure).

The filtrate from which the chloroform solvate is taken is made alkaline with ammonium hydroxide and the amine extracted with methylene chloride. The amine is recovered by evaporation of the dried (potassium carbonate) solvent and converted to the hydrochloride. The yield is 5.80 g. (24.1 millimoles) 120.0% of the theoretical 1(—) amine available, melting point 227–258° C. The specific rotation, $\alpha_D^{25}$ of this product is —61.5° (C.=10, $H_2O$) indicating that it is 74.5% optically pure.

Example 11

A two phase mixture of 8.72 g. (20 millimoles) dl 6-phenyl - 2,3,5,6 - tetrahydroimidazo[2,1-b]thiazole d-10-camphorsulfonate, 4.08 g. (20 millimoles) dl 6-phenyl-2,3,5,6-tetrahydroimidazo[2,1-b]thiazole, 20 ml. water, 1.20 g. (20 millimoles) acetic acid, and 7.16 g. (60 millimoles) chloroform is cooled to 0° and seeded. The mixture is stirred overnight at 0° while the d(+)6-phenyl-2,3,5,6-tetrahydroimidazo[2,1-b]thiazole d - 10-camphorsulfonate chloroform solvate crystallizes. The solvate is recovered by filtration and washed three times with 15 ml. portions of 10% sodium chloride which has been cooled to 0° and saturated with chloroform. The solvate is dissolved in approximately 50 ml. of methylene chloride and this solution extracted 75 ml. 3 N ammonium hydroxide to liberate the amine and to recover the d-10-camphorsulfonic acid as the ammonium salt. Evaporation of this aqueous extract gives 4.1 g. (16.45 millimoles), 82.4% of recovered ammonium d-10-camphorsulfonate.

The methylene chloride solution is dried with anhydrous potassium carbonate and the solvent evaporated. The residue is dissolved in acetone and the solution acidified with 4 N isopropanolic hydrogen chloride to precipitate the amine hydrochloride. The yield of d(+)6-phenyl-2,3,5,6-tetrahydroimidazo-[2,1-b]thiazole hydrochloride is 3.70 g. (15.35 millimoles), 77% of theory, melting point 227° C. The specific rotation, $\alpha_D^{25}$, is +118.5° (98% optically pure).

The filtrate from which the solvate has been recovered is made alkaline with ammonium hydroxide and the liberated amine extracted with methylene chloride. This product is converted to the hydrochloride as before. The yield is 5.45 g. (22.6 millimoles), 113% of the theoretical l(−)amine available, 227°–250° C. The specific rotation, $\alpha_D^{25}$, is −79.4° (82% optically pure). The optical purity can be corrected by precipitating the dl component as the dl 6-phenyl-2,3,5,6-tetrahydroimidazo[2,1-b]thiazole d-10-camphorsulfonate from a solvent such as toluene.

Example 12

A two phase mixture of 2.41 g. (10 millimoles) of l(−)6-phenyl-2,3,5,6 - tetrahydroimidazo[2,1-b]thiazole hydrochloride, 3.08 g. (12.1 millimoles) of sodium dl 10-camphorsulfonate, 15 ml. of water, and 3.58 g. (30 millimoles) of chloroform is prepared. On cooling to 0° the l(−)6-phenyl-2,3,5,6 - tetrahydroimidazo[2,1-b]thiazole l-10-camphorsulfonate solvate begins crystallizing. After standing over the weekend the solvate is recovered by filtration and washed with a small amount of ice cold water which is saturated with chloroform. The solvate is immediately recrystallized from 10 ml. of chloroform and dried to decompose the solvate. The yield is 2.3 g. (5.26 millimoles), 87% based on the l-10-camphorsulfonate available. The product has a specific rotation, $\alpha_D^{25}$, of −74.8°.

Example 13

A two phase system at 4.82 g. (20 millimoles) l(−)6-phenyl - 2,3,5,6 - tetrahydroimidazo[2,1-b]thiazole hydrochloride, 10.16 g. (40 millimoles) of sodium dl 10-camphorsulfonate, 25 ml. water and 7.16 g. (20 millimoles) of chloroform is cooled to 0° and seeded. The solvate crystallizes rapidly. After standing one hour at 0° the solvate is recovered by filtration and washed twice with 10 ml. portions of 12 g. sodium chloride which has been cooled to 0° and saturated with chloroform. The solvate is dissolved in acetone and this solution evaporated to dryness. The dry l(−)6-phenyl-2,3,5,6-tetrahydroimidazo-[2,1-b]thiazole l-10-camphorsulfonate weighs 7.6 g. (17.4 millimoles), 87%. The specific rotation $\alpha_D^{25}$ is −73° (C.=15, $H_2O$). A 7.2 g. aliquot is recrystallized from approximately 30 ml. of chloroform (some activated carbon is used to clarify the solution). The recovery is 3.28 g. 73.5% recovery, melting point 139°–140° C., $\alpha_D^{25}$ −82.6 (C.=15, $H_2O$).

The l-camphor 10-sulfonic acid can be obtained from this salt by treatment with an alkali metal or ammonium hydroxide, where it is obtained as a salt.

If it is desirable to use the l-10-camphorsulfonic acid for the resolution of dl 6-phenyl imidazo[2,1-b]thiazole, this resolved salt can be treated with the dl amine in a suitable solvent to liberate the l-amine and obtain the dl 6-phenyl - 2,3,5,6 - tetrahydroimidazo[2,1-b]thiazole l-10-camphorsulfonate salt which can be resolved with chloroform or with a chloroform-water mixture.

Example 14.—Recovery of ammonium d-10-camphorsulfonate

A solution is prepared by dissolving 277.6 grams (0.63 mole) of l(−)6-phenyl-2,3,5,6-tetrahydroimidazo[2,1-b]thiazole d-10-camphorsulfonate in 750 milliliters absolute ethanol by warming. Gaseous ammonia is added to the stirred solution to decompose the salt and precipitate the d-10-camphorsulfonic acid as the ammonium salt. The salt is recovered by filtration and washed with absolute ethanol followed by acetone. The recovered salt weighs 102.6 grams (0.41 mole). The filtrate is evaporated to a syrup which is partitioned between chloroform and ammonium hydroxide solution. The aqueous layer is separated and evaporated to dryness yielding an additional 44.7 grams (0.179 mole) of ammonium d-10-camphorsulfonate bringing the total recovery to 93.5%. The l(−)6-phenyl-2,3,5,6-tetrahydroimidazo[2,1-b]thiazole is recovered by evaporation of the chloroform phase.

Other solvents can be substituted for ethanol or the ammonium salt can be obtained by evaporation of the water from an ammonium hydroxide/chloroform partition. The ammonium salt can also be salted out at aqueous solutions.

Example 15

Mice were experimentally inoculated with thirty infectious larvoe of *Nematospiroides dubius*. After 19 days, when the worms had matured, randomly selected groups of eight mice for each dosage level of the three compounds (l), (dl), and (d) received single oral doses by gavage. Three days after treatment, the mice were sacrificed, the small intestines removed, and all worms present were enumerated. Average worm numbers were determined for the group of eight treated mice on each regimen, and the present efficacy of each dosage was calculated by comparison with average worm numbers for 10 or 20 control mice which had not received drug treatment using the customary formula:

% efficacy =

$$\frac{\text{Avg. worms in contols} - \text{avg. worms in treated}}{\text{Avg. worms in controls}} \times 100$$

Test B indicates that the dextro compound is markedly inferior to the others, showing less than 50% activity at 48 mg./kg. orally, while 150 mg./kg. orally is highly lethal to mice (see later). Tests A and B show that the laevo compound ($ED_{50}$ about 5 mg./kg.) is approximately twice as active anthelmintically as the dextro-laevo compound ($ED_{50}$ about 10 mg./kg.). The following Table I summarizes the above results.

TABLE I.—PERCENT EFFICACY IN MICE

| Oral dose, mg./kg. | Test A | | Test B | | |
|---|---|---|---|---|---|
| | Laevo | Dextro-laevo | Laevo | Dextro-laevo | Dextro |
| 2 | 0 | | 0 | | |
| 4 | 22 | | 47 | | |
| 6 | | 0 | 69 | 10 | |
| 8 | 88 | 36 | 79 | 31 | |
| 12 | | 71 | 97 | 61 | |
| 16 | | 93 | | 83 | 0 |
| 32 | | | | | 22 |
| 48 | | | | | 36 |

Example 16

The above results on the comparable activity of 5 mg./kg. of the laevo and 10 mg./kg. of the dextro-laevo compound has been confirmed in additional tests by similar prodcedures. The laevo compound at 5 mg./kg. removed on the average 68% of aduct *N. dubius*, whereas the dextro-laevo at twice this dose removed 74% of the worms. Again (test F) the dextro compound at a much higher dose, 40 mg./kg. removed only 34% of the worms. Testing results are shown in the folowing Table II.

TABLE II.—MICE

| Test | Compound | No. mice per dose | Percent efficacy at doses shown (mg./kg.) | | | |
|---|---|---|---|---|---|---|
| | | | 5 | 10 | 20 | 40 |
| C | dl | 8 | | 74 | 99 | |
| C | l | 8 | 65 | 97 | 99 | |
| D | dl | 8 | | 77 | | |
| D | l | 8 | 74 | | | |
| E | dl | 8 | 12 | 70 | | |
| E | l | 40 | 64 | | | |
| F | dl | 5 | | | 98 | |
| F | d | 17 | | | | 34 |

Example 17

The acute oral and subcutaneous toxicity of the three compounds was compared in white mice. All mice were held for four or more days after dosing. Mortality due to drug occurred predominantly within the first four hours after administration. The following Table III shows that there are no significant differences between the acute oral toxicity of the three compounds. The acute subcutaneous toxicity are also similar, but the laevo compound may be slightly less toxic than the others. The mouse data on similar toxicity and dissimilar activity of the laevo compared to the dextro-laevo compound indicate that the former gives a twofold improvement in the chemotherapeutic index, i.e., in safety, over the latter.

TABLE III

| Mg./kg. | Dead/total mice | | |
|---|---|---|---|
| | Laevo | Dextro-laevo | Dextro |
| Oral dosage: | | | |
| 100 | 0/10 | 1/10 | 1/10 |
| 150 | 16/30 | 8/30 | 8/10 |
| 200 | 16/20 | 15/20 | 8/10 |
| 300 | 9/10 | 10/10 | 9/10 |
| Subcutaneous dosage: | | | |
| 20 | 0/10 | 0/10 | 0/10 |
| 40 | 0/30 | 1/30 | 2/10 |
| 60 | 7/30 | 20/30 | 10/10 |
| 80 | 23/30 | 18/20 | |

Example 18

Young lambs were experimentally inoculated with infectious larve of *Trichostrongylus colubriformis*. After sheep were allocated at random to various dosage groups containing four sheep each, and the animals treated by the oral drench method. All lambs were slaughtered several days after treatment, and the numbers of worms present in the small intestine were determined. The five unmedicated lambs used for this trial had an average of 3,520 worms (range 2,830 to 3,870). The percent efficacy for treated groups was determined by the conventional method of "controlled tests" (see Example 11) with four treated sheep per medicated treatment level.

The results indicate that on a dosage basis the laevo compound is approximately twice as active as the dextro laevo compound against this important sheep helminth nematode.

In other trials on subcutaneous toxicity, two sheep received 40 mg./kg. of the laevo compound, and two other sheep received 40 mg./kg. of the dextro-laevo compound. All four sheep showed similar transient mild side reactions. Thus, the two compounds have similar subcutaneous toxicity, two sheep received 40 mg./kg. of the laevo compound, and two other sheep received 40 mg./kg. of the dextro-laevo compound. All four sheep showed similar transient mild side reactions. Thus, the two compounds have similar subcutaneous toxicity at doses in the neighborhood of the maximum tolerated dosage. In other toxicity trials with subcutaneous dosage of the dextro-laevo compound 80 mg./kg. killed two of two sheep, and 60 mg./kg. produced moderate to severe side reactions in three sheep, and mild reactions in three others. Data summarized in the following Table IV.

TABLE IV.—SHEEP ACTIVITY DATA

| Compound | Oral dose, mg./kg. | Percent efficacy, T. colubriformis |
|---|---|---|
| Laevo | 2.5 | 72 |
| Do | 3.75 | 92 |
| Dextro-laevo | 2.5 | 33 |
| Do | 5.0 | 83 |
| Do | 7.5 | 97 |

Example 19

In comparative toxicity trials with calves, four calves each received 40 mg./kg. intramuscularly of the l (two doses), the dl (one dose), and the d compound (one dose) using a "cross-over" design and with an interval of one week between the four successive doses. The side reactions observed occurred promptly, no animals died, and all recovered within several hours. The laevo compound may be less toxic than the others at the above dosage to judge by the following tabulation.

TABLE V.—INCIDENCE AND SEVERITY OF SIDE REACTIONS

| Compound, 40 mg./kg. | Mild | Moderate | Moderate | Moderate to severe |
|---|---|---|---|---|
| l | 4 | 4 | 0 | 0 |
| dl | 1 | 1 | 1 | 1 |
| d | 0 | 1 | 2 | 1 |

Two weeks after the last of the above series of 40 mg./kg. doses, all four calves were treated with 60 mg./kg. intramuscularly with results as follows: one calf which received the dextro compound showed very severe reactions and died within two hours; one calf which received the dextro-laevo compound showed moderate transient side reactions; two calves which received the laevo compound showed mild to moderate transient symptoms. Twenty days following the above 60 mg./kg. doses, two surviving calves received 90 mg./kg. intramuscularly of either the laevo or the dextro-laevo compound—both developed very severe reactions and died by 105 and 50 minutes, respectively.

The above data at 60 and 90 mg./kg. further indicates that the three compounds have relatively similar toxicity to cattle, but the laevo compound may be somewhat less toxic at doses below 90 mg./kg. intramuscularly.

The comparison between the oral toxicity for cattle of the laevo compound and the dextro-laevo compound was made at 40 mg./kg. by oral drench. A "cross-over" design was used, i.e., two animals each first received the laevo and two the dextro-laevo compound. Several weeks later the four animals were treated again, but the compounds used were interchanged. Similar transient and mild side reactions were observed after the above four treatments with each of the two compounds, primarily intermittent restlessness for several hours. The dosage of 40 mg./kg. used approaches the maximum tolerated dose for the dextro-laevo compound. The other cattle toxicity trials using the oral drench procedure, two of six animals receiving 60 mg./kg. of the dextro-laevo compound died after treatment, whereas the other four animals showed mild to moderate side reactions.

Example 20

Cattle with naturally acquired nematode infections were divided into groups of five animals which had similar average numbers of nematode eggs in their stools. Five animals were treated by the oral drench procedure at each of various dosages of the dextro-laevo or of the laevo compound, and two groups of five animals each were retained as controls. All animals were sacrificed three or four days after treatment, necropsied, the worms present in their abomasa counted, and the average percent efficacy determined by comparison with ten unmedicated controls.

The results (Table VI) below show that the laevo compound is considerably more active than the dextro-laevo compound against *T. axei* on a dosage basis, as 2.5 mg./kg. of the former has efficacy at least equivalent to 5.0 mg./kg. and probably to 7.5 mg./kg. of the latter. Similar results were also obtained against Haemonchus and Ostertagia. However, since 5 mg./kg. of the dextro-laevo compound was highly effective against both these helminths, unlike *T. axei*, quantitative comparison between the two compounds cannot be made.

TABLE VI

| Compound | Oral dose, mg./kg. | Percent efficacy (avg. worm number) | | |
|---|---|---|---|---|
| | | Trichostrongylus axei | Haemonchus | Ostertagia |
| None | | (10,500) | (370) | (1,600) |
| Laevo | 2.5 | 93 (716) | 99 (5) | 96 (64) |
| | 5.0 | 94 (680) | 100 (0) | 91 (136) |
| Dextro-laevo | 5.0 | 60 (4,150) | 100 (0) | 90 (165) |
| | 7.5 | 94 (640) | 100 (0) | 96 (72) |

The data cited in Examples 14–16 indicate that the laevo and dextro-laevo compounds have similar toxicity in sheep and cattle, and that the quantitative activity of the laevo compound is greater against at least some important nematodes of these ruminants. Therefore, the laevo compound can be used with greater assurance of safety, than the dextro-laevo compound.

I claim:

1. A method of resolving dl 6-phenyl-2,3,5,6-tetrahydroimidazo[2,1-b]thiazole which comprises mixing dl 6-phenyl-2,3,5,6-tetrahydroimidazo[2,1-b]thiazole with a compound selected from the group consisting of 1-10-camphorsulfonic acid and d-10-camphorsulfonic acid in a solvent selected from the group consisting of chloroform and chloroform-water, cooling the solution to below 35° C., mechanically separating the insoluble chloroform solvate of the group consisting of d(+)6-phenyl-2,3,5,6-tetrahydroimidazo[2,1-b]thiazole d-10-camphorsulfonate and l-(—)6-phenyl-2,3,5,6-tetrahydroimidazo[2,1-b]thiazole 1-10-camphorsulfonate.

2. In a method of resolving dl 6-phenyl-2,3,5,6-tetrahydroimidazo[2,1-b]thiazole in accordance with claim 1 the steps which comprise mixing said dl 6-phenyl-2,3,5,6-tetrahydroimidazo[2,1-b]thiazole with chloroform and a compound selected from the group consisting of 1-10-camphorsulfonic acid and d-10-camphorsulfonic acid; and mechanically separating the crystallized chloroform solvate from the mother liquor.

3. In a method of resolving dl 6-phenyl-2,3,5,6-tetrahydroimidazo[2,1-b]thiazole in accordance with claim 1 the steps which comprise mixing said dl 6-phenyl-2,3,5,6-tetrahydroimidazo [2,1-b]thiazole with a compound selected from the group consisting of 1-10-camphorsulfonic acid and d-10-camphorsulfonic acid in aqueous chloroform, wherein the amount of chloroform present is about 3 moles for each mole of the insoluble solvate formed, and mechanically separating the crystallized chloroform solvate from the mother liquor.

4. A method in accordance with claim 1 for preparing a compound selected from the group consisting of l(—)6-phenyl-2,3,5,6-tetrahydroimidazo[2,1-b]thiazole d-10-camphorsulfonate and d(+)6-phenyl-2,3,5,6-tetrahydroimidazo[2,1-b]thiazole 1-10-camphorsulfonate which comprises evaporating the chloroform solution; adding to the residue hot acetone; mechanically separating the insoluble racemic salt selected from the group consisting of dl 6-phenyl-2,3,5,6-tetrahydroimidazo[2,1-b]thiazole d-10-camphorsulfonate and dl 6-phenyl-2,3,5,6-tetrahydroimidazo[2,1-b]thiazole 1-10-camphorsulfonate; cooling and mechanically separating from said acetone mixture a compound selected from the group consisting of l(—)6-phenyl-2,3,5,6-tetrahydroimidazo[2,1-b]thiazole d-10-camphorsulfonate and d(+)6-phenyl-2,3,5,6-tetrahydroimidazo[2,1-b]thiazole 1-10-camphorsulfonate.

5. A method of preparing a compound selected from the group consisting of d(+)6-phenyl-2,3,5,6-tetrahydroimidazo[2,1-b]thiazole and 1(—)6-phenyl-2,3,5,6-tetrahydroimidazo[2,1-b]thiazole which comprises mixing a compound selected from the group consisting of d(+)6-phenyl-2,3,5,6-tetrahydroimidazo[2,1-b]thiazole d-10-camphorsulfonate, 1(—)6-phenyl-2,3,5,6-tetrahydroimidazo[2,1-b]thiazole 1-10-camphorsulfonate, 1(—)6-phenyl-2,3,5,6-tetrahydroimidazo[2,1-b]thiazole d-10-camphorsulfonate and d(+)6-phenyl-2,3,5,6-tetrahydroimidazo[2,1-b]thiazole 1-10-camphorsulfonate with water and an alkali metal hydroxide, extracting said mixture with chloroform, and removing said chloroform to produce a compound selected from the group consisting of d(+)6-phenyl-2,3,5,6-tetrahydroimidazo[2,1-b]thiazole substantially free of the l-isomer and 1(—)6-phenyl-2,3,5,6,-tetrahydroimidazo[2,1-b]thiazole substantially free of the d-isomer.

6. A camphorsulfonate salt selected from the group consisting of 1(—)6-phenyl-2,3,5,6-tetrahydroimidazo[2,1-b]thiazole d-10-camphorsulfonate; 1(—)6-phenyl-2,3,5,6-tetrahydroimidazo[2,1-b]thiazole 1-10-camphorsulfonate; d(+)6-phenyl-2,3,5,6-tetrahydroimidazo[2,1-b]thiazole d-10-camphorsulfonate; and d(+)6-phenyl-2,3,5,6-tetrahydroimidazo[2,1-b]thiazole 1-10-camphorsulfonate.

7. A compound selected from the group consisting of 1(—)6-phenyl-2,3,5,6-tetrahydroimidazo[2,1-b]thiazole having a rotation of about $\alpha_D^{25}$—85.1° (concentration 10%, $CHCl_3$) and a melting point about 60°–61.5° C.; d(+)6-phenyl-2,3,5,6-tetrahydroimidazo[2,1-b]thiazole having a rotation of about $\alpha_D^{25}$+85.1° (concentration 10%, $CHCl_3$) and a melting point about 60°–61.5° C.; and the hydrogen halide salts thereof.

8. The compound 1(—)6-phenyl-2,3,5,6-tetrahydroimidazo[2,1-b]thiazole having a rotation of about $\alpha_D^{25}$—85.1° (concentration 10%, $CHCl_3$) and a melting point about 60°–61.5° C.

9. In a method for the resolution of dl-10-camphorsulfonic acid the steps which comprise: treating dl-10-camphorsulfonic acid with chloroform and a compound selected from the group consisting of d(+)6-phenyl-2,3,5,6-tetrahydroimidazo[2,1-b]thiazole and 1(—)6-phenyl-2,3,5,6-tetrahydroimidazo[2,1-b]thiazole; mechanically separating the insoluble chloroform solvate from the mixture, and obtaining from said mixture the compound selected from the group consisting of d(+)6-phenyl-2,3,5,6-tetrahydroimidazo[2,1-b]thiazole d-10-camphorsulfonate and 1(—)6-phenyl-2,3,5,6-tetrahydroimidazo[2,1-b]thiazole 1-10-camphorsulfonate.

10. In a method according to claim 9, for the resolution of dl-10-camphorsulfonic acid the steps which comprise: mixing dl-10-camphorsulfonic acid with chloroform and a compound selected from the group consisting of 1(—)6-phenyl-2,3,5,6-tetrahydroimidazo[2,1-b]thiazole and d(+)6-phenyl-2,3,5,6-tetrahydroimidazo[2,1-b]thiazole; mechanically separating the insoluble chloroform solvate from the mixture, concentrating the mother liquor, adding to the concentrated mother liquor obtained from said mechanical separation, hot acetone, cooling the acetone mixture to crystallize the reaction product which is a compound selected from the group consisting of 1(—)6-phenyl-2,3,5,6-tetrahydroimidazo[2,1-b]thiazole d-10-camphorsulfonate and d(+)6-phenyl-2,3,5,6-tetrahydroimidazo[2,1-b]thiazole 1-10-camphorsulfonate.

11. A method for the preparation of a compound selected from the group consisting of ammonium d-10- camphorsulfonate and ammonium l-10-camphorsulfonate comprising: mixing a compound selected from the group consisting of 1(—)6-phenyl-2,3,5,6-tetrahydroimidazo-[2,1-b]thiazole d-10-camphorsulfonate; d(+)6-phenyl-2,3,5,6-tetrahydroimidazo[2,1-b]thiazole l-10-camphorsulfonate; 1(—)6-phenyl-2,3,5,6-tetrahydroimidazo[2,1-b]thiazole l-10-camphorsulfonate; and d(+)6-phenyl-2,3,5,6-tetrahydroimidazo[2,1-b]thiazole d-10-camphorsulfonate with heated alcohol, and mixing the thus prepared solution with ammonia to precipitate the ammonium salt of said corresponding 10-camphorsulfonic acids.

References Cited

UNITED STATES PATENTS 3,177,118  4/1965  Baetz _____ 260—306.7

NICHLOAS S. RIZZO, Primary Examiner

R. J. GALLAGHER, Assistant Examiner

U.S. Cl. X.R.

260—501.21, 503; 424—270